(12) United States Patent
Ikeda et al.

(10) Patent No.: US 8,314,342 B2
(45) Date of Patent: Nov. 20, 2012

(54) WINDING APPLIED SINGLE VACUUM PRESSURE IMPREGNATION INSULATION SYSTEM, A WINDING APPLIED GLOBAL VACUUM PRESSURE IMPREGNATION INSULATION SYSTEM AND AN ELECTRICAL ROTATING MACHINE HAVING SAID INSULATION SYSTEMS

(75) Inventors: Kenji Ikeda, Hitachi (JP); Hisashi Morooka, Hitachinaka (JP); Keiji Suzuki, Hitachi (JP); Mitsuru Onoda, Takahagi (JP); Nobuaki Tanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 993 days.

(21) Appl. No.: 11/679,249

(22) Filed: Feb. 27, 2007

(65) Prior Publication Data
US 2007/0252449 A1 Nov. 1, 2007

(30) Foreign Application Priority Data

Apr. 26, 2006 (JP) .................. 2006-121489

(51) Int. Cl.
*H05K 1/00* (2006.01)
*H01B 7/00* (2006.01)
*H02K 15/12* (2006.01)
*D02G 3/00* (2006.01)
*B32B 5/16* (2006.01)

(52) U.S. Cl. ........ 174/258; 174/120 R; 310/45; 427/104; 427/116; 428/361; 428/363

(58) Field of Classification Search .................. None
See application file for complete search history.

(56) References Cited

U.S. PATENT DOCUMENTS

| 3,556,925 | A | | 1/1971 | Mertens | |
|---|---|---|---|---|---|
| 4,224,541 | A | * | 9/1980 | Smith et al. | 310/45 |
| 4,268,810 | A | * | 5/1981 | Iwasa et al. | 336/205 |
| 4,336,302 | A | | 6/1982 | Ihlein | |
| 5,032,453 | A | * | 7/1991 | Rogler et al. | 428/324 |
| 5,733,402 | A | * | 3/1998 | Sugawara et al. | 156/185 |
| 6,441,527 | B1 | * | 8/2002 | Taji et al. | 310/201 |

FOREIGN PATENT DOCUMENTS

JP 07-001500 1/1995
(Continued)

OTHER PUBLICATIONS

EP Search of Appln. No. 07003894 dated Jul. 2, 2010.
(Continued)

*Primary Examiner* — Camie Thompson
(74) *Attorney, Agent, or Firm* — Antonelli, Terry, Stout & Kraus, LLP.

(57) ABSTRACT

The present invention is designed to provide an insulation coil with high insulation reliability using a dry mica tape, an integral impregnation coil and a mica tape for the electrical rotating machines using these coils, said mica tape having a long shelf life and capable of preventing run-off of the impregnating epoxy resin composition during curing, with the cured product of said epoxy resin composition being high in heat resistance. It is also envisaged to provide a single insulation coil using a mica tape containing epoxy adduct imidazole as an epoxy resin curing catalyst or a mica tape containing a mixture of epoxy adduct imidazole and zinc naphthenate. An integral impregnation coil made by using said insulation coil and an epoxy resin composition, and the electrical rotating machines using such coils are also provided.

12 Claims, 2 Drawing Sheets

(a) GENERAL EXTERNAL VIEW OF SINGLE INSULATION COIL (b) ENLARGED SECTIONAL VIEW OF THE INSIDE

FOREIGN PATENT DOCUMENTS

| | | |
|---|---|---|
| JP | 7-256814 | 10/1995 |
| JP | 11-213757 | 8/1999 |
| JP | 11-215753 | 8/1999 |
| JP | 11-312757 | 11/1999 |
| JP | 2001-288334 | 10/2001 |
| JP | 2004-307761 | 11/2004 |

OTHER PUBLICATIONS

JP Office Action of Appln. 2006-121489 dated Dec. 14, 2010.

\* cited by examiner (a) GENERAL EXTERNAL VIEW OF SINGLE INSULATION COIL (b) ENLARGED SECTIONAL VIEW OF THE INSIDE (a) FRONTAL SECTIONAL VIEW OF VACUUM PRESSURE INSULATION COIL (b) ENLARGED SECTIONAL VIEW OF IRON CORE SLOT

WINDING APPLIED SINGLE VACUUM PRESSURE IMPREGNATION INSULATION SYSTEM, A WINDING APPLIED GLOBAL VACUUM PRESSURE IMPREGNATION INSULATION SYSTEM AND AN ELECTRICAL ROTATING MACHINE HAVING SAID INSULATION SYSTEMS

FIELD OF THE INVENTION

The present invention relates to an insulation coil, a vacuum pressure insulation coil and rotating machines using these coils.

BACKGROUND OF THE INVENTION

Request for reduction of manufacturing cost, higher performance and reduction of size and weight of the electrical rotating machines for general industrial use such as dynamos has become increasingly strong. In order to satisfy these requirements, quests have been made for various approaches such as optimization and simplification of coil designing and insulating composition, and optimization of the insulation system for the rotating machine stators (mostly composed of insulation coil and iron core). Typically, single prepreg system, single impregnation system and vacuum pressure impregnation system, as briefly described below, are adopted for the insulation of stators.

(1) In the single prepreg system, a prepreg mica tape is wound around an insulation coated conductor shaped into a regulated configuration, and heat cured to form an insulation coil, and this insulation coil is housed in an iron core slot and fixed in position by a pile or a pile liner to thereby constitute a stator.

(2) In the single impregnation system, an insulating mica tape is wound around an insulation coated conductor shaped into a regulated configuration to form a single insulation coil, and it is impregnated with an epoxy resin composition in vacuo under pressure, followed by heat curing to make an insulation coil. This insulation coil is housed in an iron core slot and fixed by a pile or a pile liner to constitute a stator.

(3) In the vacuum pressure impregnation system, an electrically insulating mica tape is wound around an insulation coated conductor shaped into a regulated configuration to make a single insulation coil, and it is incorporated in an iron core slot, fixed therein by a pile or a pile liner and connected at the outer end of the iron core for integration. An epoxy resin composition is vacuum pressure impregnated in the integrated single insulation coil and iron core, and then the epoxy resin composition is heat cured to constitute a stator.

The electrically insulating mica tape used for the said single impregnation system or vacuum pressure impregnation system is generally composed of mica, a reinforcing layer such as glass cloth or organic material film, a binder resin for bonding these mica and reinforcing layer, and a curing catalyst for the epoxy resin composition impregnated in the mica tape.

JP-A-11-215753 (Patent Document 1) discloses an insulating mica tape used for the insulation coils which is featured by a prolonged shelf life realized by using a phenol resin in lieu of an epoxy resin as a binder resin and a shortened gel time achieved by using an imidazole compound or zinc naphthenate as a curing catalyst for the impregnating epoxy resin composition.

In the prepreg sheet for the metallized laminates or wiring boards disclosed in JP-A-2004-307761 (Patent Document 2), a biphenyl type epoxy resin is used as the impregnating resin and an imidazole compound or zinc naphthenate is used as a curing catalyst to realize enhancement of glass transition temperature (Tg) as well as improvements of peel strength and dielectric properties.

In the insulating mica tape for electric devices disclosed in JP-A-11-213757 (Patent Document 3), an elongation of shelf life is realized by applying a curing catalyst on the base glass fiber and coating the periphery of the curing catalyst with a thermoplastic resin which does not cause a curing reaction with the catalyst while using an imidazole compound or zinc naphthenate as said curing catalyst.

Patent Document 1: JP-A-11-215753

Patent Document 2: JP-A-2004-307761

Patent Document 3: JP-A-11-213757

BRIEF SUMMARY OF THE INVENTION

The insulating mica tapes contain a binder resin and a curing catalyst for the epoxy resin composition used for impregnation, and in many cases, an epoxy resin is used as the binder resin for improving heat resistance of the insulating layer formed by impregnating the mica tape with an epoxy resin composition and curing it. Therefore, if an ordinary imidazole compound is used as the curing catalyst, there takes place a binder resin curing reaction to cause hardening of the mica tape, which deteriorates the conductor taping workability. Thus, use of a conventional imidazole compound as curing catalyst had the problem of shortened shelf life of the mica tape. On the other hand, single use of zinc naphthenate as curing catalyst would lower glass transition temperature of the cured product, causing deterioration of heat resistance and electrical properties at high temperatures.

JP-A-11-215753 (Patent Document 1) realizes an elongation of shelf life by using a phenol resin as binder resin, but use of a phenol resin involves the problem of lowered glass transition temperature of the cured product in comparison with epoxy resins.

JP-A-2004-307761 (Patent Document 2) had the problem that the shelf life of the mica tape is short at room temperature (20-40° C.) because of incorporation of an epoxy resin in the base resin and use of an ordinary imidazole compound as curing catalyst.

JP-A-11-213757 (Patent Document 3), although capable of prolonging the shelf life by coating the periphery of the curing catalyst with a thermoplastic resin, had the disadvantage that heat resistance (glass transition temperature) is lowered.

The present invention is envisioned to provide an insulation coil and a vacuum pressure insulation coil with high insulation reliability, and rotating machines incorporated with these coils, by using an insulating mica tape which has a long shelf life, is capable of preventing run-off of the impregnating epoxy resin composition during curing, and can provide a cured product of the said epoxy resin composition with high heat resistance.

The insulating mica tape according to the present invention comprises mica, a reinforcing layer such as glass cloth or organic material film, and a curing catalyst for the impregnating epoxy resin composition. A salient feature of the present invention which is designed to solve the above problem resides in use of a mixture of an epoxy adduct imidazole (Formula 1) and zinc naphthenate (Formula 2) as a curing catalyst for the epoxy resin composition.

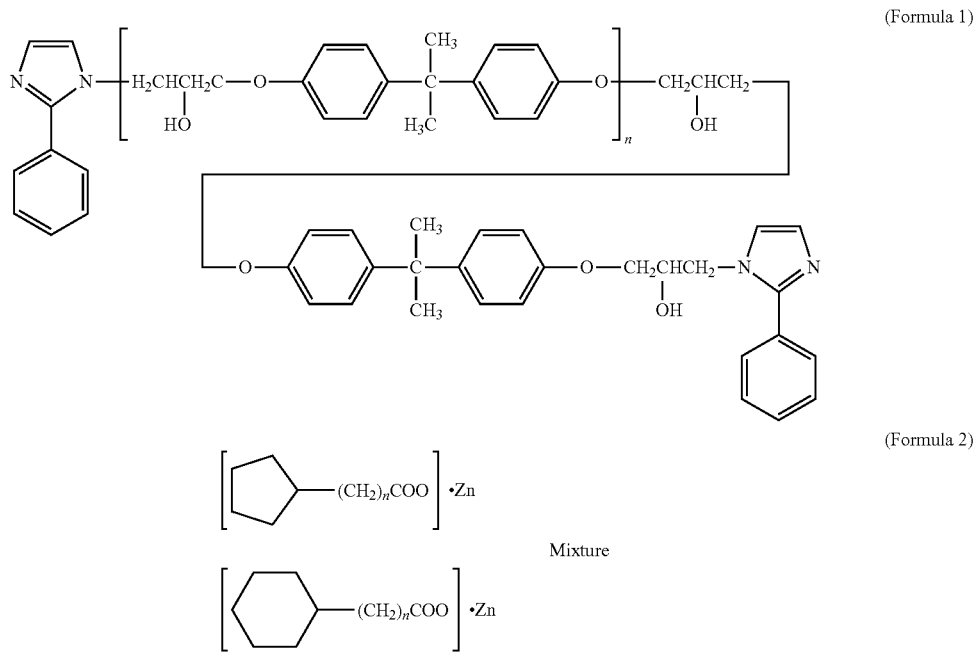

(Formula 1)

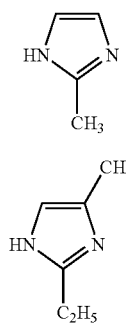

Mixture

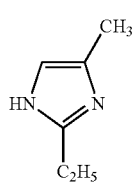

Epoxy adduct imidazole is characterized in that its catalytic activity is low at room temperature (20-40° C.) but high in the high temperature region of 150° C. or above in comparison to the imidazole compounds such as 2-methylimidazole (Formula 3) and 2-ethyl-4-methylimidazole (Formula 4).

(Formula 3)

(Formula 4)

Thus, epoxy adduct imidazole (Formula 1) is low in catalytic activity with the binder resin (mostly an epoxy resin) at room temperature (20-40° C.) and conducive to elongation of shelf life of the product. It also contributes to the enhancement of heat resistance after curing of the impregnating epoxy resin composition. Therefore, use of a mica tape incorporated with epoxy adduct imidazole as a curing catalyst realizes elongation of shelf life in preservation and also enables obtainment of a cured product of an epoxy resin composition with high heat resistance (glass transition temperature).

On the other hand, zinc naphthenate, like epoxy adduct imidazole, has the properties that its catalytic activity is low at room temperature (20-40° C.) but high at a temperature of or higher than 100° C. Therefore, by using a mixture of epoxy adduct imidazole and zinc naphthenate, it becomes possible to carry out gelation of the introduced epoxy resin composition at a low temperature, making it possible to prevent runoff, during curing, of the epoxy resin composition impregnated in the single body of insulation coil or vacuum pressure insulation coil.

As described above, by combined use of epoxy adduct imidazole and zinc naphthenate, it is possible to prolong the shelf life during preservation and to reduce gel time, and this makes it possible to prevent the impregnating epoxy resin composition from running off during curing and to obtain a cured product of epoxy resin composition with high heat resistance (glass transition temperature).

Other objects, features and advantages of the invention will become apparent from the following description of the embodiments of the invention taken in conjunction with the accompanying drawings.

DESCRIPTION OF REFERENCE NUMERALS

Figure 1:
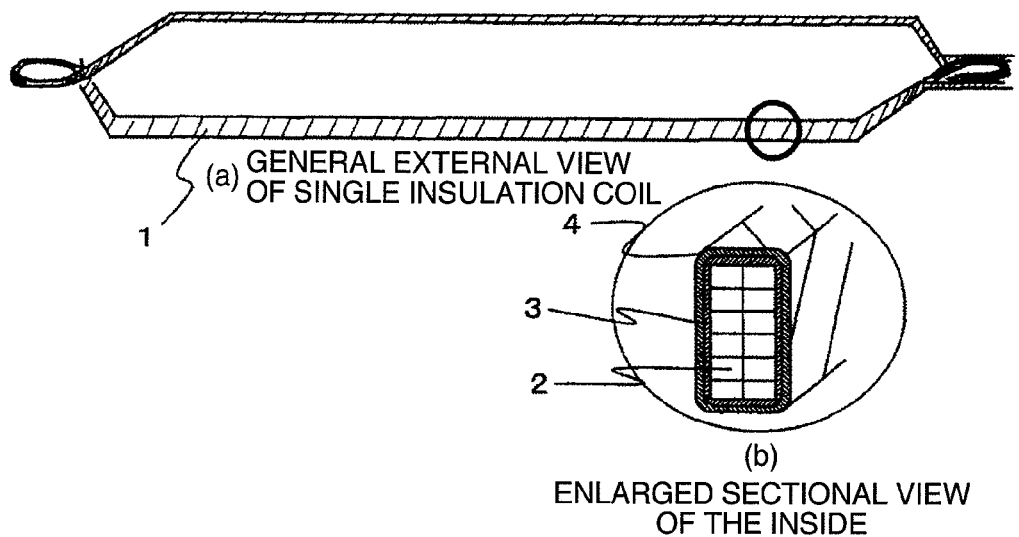
FIG. 1(a) is a general external view of an insulation coil according to the present invention and (b) is an enlarged sectional view of the inside.

1: insulation coil
2: conductor
3: insulating mica tape
4: corona shield
5: iron core
6: iron core slot
7: pile liner 8: pile
9: vacuum pressure insulation coil (stator)
10: rotor
11: rotating machine

DETAILED DESCRIPTION OF THE INVENTION

An insulation coil, a vacuum pressure insulation coil, a rotating machine and an insulating mica tape used therefor according to the present invention are explained below.
<Insulating Mica Tape>
The insulating mica tape wound around the conductor of an insulation coil or vacuum pressure insulation coil is composed of at least mica, a reinforcing layer and a curing catalyst.
As mica, there can be used, for instance, mica paper tape or flake mica according to the insulation treating system such as single impregnation system or vacuum pressure impregnation system. As reinforcing layer, glass cloth, an organic material film and such may be used in accordance with desired degree of heat resistance and insulation specifications.
Epoxy adduct imidazole (Formula 1) can be used as the curing catalyst, and zinc naphthenate (Formula 2) may be added as required. Use of epoxy adduct imidazole as the curing catalyst has the effect of prolonging the shelf life of the insulating mica tape and enhancing heat resistance of the impregnating epoxy resin composition. Also, use of zinc naphthenate has the merit of shortening gel time of the impregnating epoxy resin composition to prevent run-off of the epoxy resin composition when cured.
The optimal amounts of coating of epoxy adduct imidazole and zinc naphthenate for mica and reinforcing layer are variable depending on the required properties other than shelf life of the product. They also vary according to the thickness of mica tape and the type and amount of the impregnating resin used (such as epoxy resin composition). These factors are properly selected for satisfying the various requirements such as elongation of the shelf life of the mica tape used for the electrical insulation coil or vacuum pressure insulation coil, shortening of gel time during curing of the mica tape and the impregnating epoxy resin composition, and improvement of heat resistance (glass transition temperature) of the cured product of the impregnating epoxy resin composition.
As for the optimal amounts of coating of epoxy adduct imidazole and zinc naphthenate, it is suggested that in case of using epoxy adduct imidazole singly, its amount of coating be preferably defined in the range of 0.3 to 5 $g/m^2$. In case of using both epoxy adduct imidazole and zinc naphthenate in combination, it is preferable to regulate the coating amount of epoxy adduct imidazole to stay in the range of 0.3 to 5 $g/m^2$ and that of zinc naphthenate in the range of 1 to 10 $g/m^2$. In this case, it is preferable that the product thickness of insulating mica tape be defined to be around 0.2 mm.
<Insulation Coil>
The insulation coil is produced by winding an insulating mica tape of this invention around an insulation coated conductor shaped into a regulated configuration to form a single insulation coil, then impregnating it with an epoxy resin composition in vacuo under pressure, and heat curing the resin composition.
<Vacuum Pressure Insulation Oil>
The electrically insulating mica tape of this invention is wound around an insulation coated conductor shaped into a regulated configuration to make a single insulation coil, and it is incorporated in an iron core slot, fixed therein by a pile or a pile liner and connected at the outer end of the iron core for integration. An epoxy resin composition is vacuum pressure impregnated in the integrated single insulation coil and iron core, and then the epoxy resin composition is heat cured to complete a vacuum pressure insulation coil.
<Rotating Machines>
A rotating machine incorporated with an insulation coil produced in the manner described above is made by setting the said insulation coil in an iron core slot, fixing therein by a pile or pile liner and connecting the coil at the outer end of the iron core to constitute a stator, and assembling this stator with a rotor. A vacuum pressure impregnation type rotating machine can be obtained by assembling the thus produced vacuum pressure insulation coil with a rotor.

EXAMPLES

In the following, the insulation coil, vacuum pressure insulation coil and rotating machines according to the present invention as well as the insulating mica tape used therefore will be described concretely with reference to the examples thereof.
The properties of the insulating mica tapes in the respective Examples and those observed when an epoxy resin composition was impregnated in said mica tapes were determined and evaluated in the manner described below.
(1) Shelf Life of Insulating Mica Tapes
The shelf life was evaluated by leaving a mica tape in the air at 23° C. for 50 days and then subjecting it to a flexibility test according to JIS C2116. Flexural properties were determined with a sample of 100 mm×15 mm×0.2 mm by using an autograph DSS-5000 (mfd by Shimadzu Corp.). If the flexibility factor is within 100 N/m, the dry mica tape can easily adhere to the conductor and hardly peels off, so that its insulating performance lasts long. Rating was made by giving ○ mark when the flexibility factor of the mica tape was within 100 N/m and X mark when the flexibility factor exceeded 100 N/m.
(2) Gel Time
The curing catalysts (epoxy adduct imidazole, zinc naphthenate, 2-ethyl-4-methylimidazole and manganese octylate) shown in Tables 1 to 3 were mixed at the rates expressed by percent (%) by weight [for example, in the case of Example 1, 0.3% by weight (0.3 g) of epoxy adduct imidazole was added to 100 g of an epoxy resin composition] to 100 g of an impregnating epoxy resin composition [for example, using an epoxy resin composition comprising 100 parts by weight of a bisphenol A epoxy resin AER-250 produced by Asahi Chemical Epoxy Co. Ltd. and 100 parts by weight of an anhydrous methylhexahydrophthalic acid curing agent HN-5500 (produced by Hitachi Chemical Industries, Ltd.]. The gel time was measured by putting a mixture of said epoxy resin composition and said curing catalyst(s) into a test tube and placing it in an oil bath adjusted to 120° C. Rating was made by giving ○ mark when the gel time was within 40 minutes as in this case run-off of the epoxy resin composition could be lessened, and X mark when the gel time exceeded 40 minutes. Gel time was also shown in parentheses ( ).
(3) Glass Transition Temperature (Tg)
The sample insulating mica plate was made by placing 15 laminations of a 200 mm×300 mm×0.20 mm insulating mica tape (sheet) between the metal plates, and impregnating them with an epoxy resin composition (for example, one comprising 100 parts by weight of a bisphenol A epoxy resin AER-250 and 100 parts by weight of an anhydrous methylhexahydrophthalic acid curing agent HN-5500) in vacuo under pressure, followed by heat curing at 170° C. for 10 hours. The sample for glass transition temperature determination was made by working the said insulating mica plate into a 10 mm×5 mm square size. Glass transition temperature was calculated from the inflection point of the coefficient of linear expansion by raising the temperature from 25° C. to 250° C. at a rate of 2° C./min in a compression mode using TM-7000 (mfd. by Ulvac Riko KK). In view of the fact that if the glass transition temperature is 140° C. or above, there hardly takes place deterioration of insulating performance in the high temperature region, rating was made by giving ○ mark when the glass transition temperature was 140° C. or higher, and X mark when the glass transition temperature was below 140° C. Glass transition temperature was also shown in parentheses.

(4) Heat Cycle Resistance of Vacuum Pressure Insulation Coil

The heat cycle test was conducted with the said impregnated coil left in a thermostat by subjecting it to 1,000 cycles of heating and cooling between 50° C. and 120° C. Heat cycle resistance was determined by measuring Δ tan δ after completion of the heat cycles. It was judged satisfactory when Δ tan δ was 2% or less.

EXAMPLES 1 TO 3 AND COMPARATIVE EXAMPLES 1 to 3

The insulating mica tapes used in Examples 1 to 3 of the present invention were prepared by bonding mica and a reinforcement layer (glass cloth) with a binder resin (bisphenol A epoxy resin) and coating said mica and reinforcement layer with epoxy adduct imidazole (trade name: P200, produced by Japan Epoxy Resin, Ltd.) in an amount shown in Table 1. In the Comparative Examples, 2-ethyl-4-methylimidazole (produced by Shikoku Chemical Co.) was used instead of epoxy adduct imidazole in an amount shown in Table 1. The properties of the insulating mica tapes in the Examples and the Comparative Examples, the amounts of the catalysts contained in the mica tapes and the results of evaluation of the properties obtained when blending an impregnating epoxy resin composition are shown in Table 1.

factor of less than 100 N/m and their shelf life was above the passing standard. Also, in each case, the gel time of the mixture of a curing catalyst(s) and an epoxy resin composition did not exceed 40 minutes, and the glass transition temperature of the cured product of said epoxy resin composition was 142° C. or above.

In contrast, in Comparative Examples 1 to 3, the curing reaction of the binder resin has advanced during preservation, and the mica tapes were hardened with their flexibility factor exceeding 100 N/m in a short time, making it unable to obtain a satisfactory shelf life.

As viewed above, by using epoxy adduct imidazole as the curing catalyst (Examples 1 to 3 of the present invention), it was possible to prolong the shelf life of the insulating mica tapes and to shorten the gel time, and there could also be obtained the cured product of an epoxy resin composition with high glass transition temperature.

EXAMPLES 4 TO 12 AND COMPARATIVE EXAMPLES 4 to 9

The insulating mica tapes of Examples 4 to 12 of the present invention were prepared by bonding mica and a reinforcing layer (glass cloth) with a binder resin (a bisphenol A epoxy resin) and then coating said mica and reinforcing layer (glass cloth) with epoxy adduct imidazole (trade name: P200, produced by Japan Epoxy Resin Co., Ltd.) and zinc naphthenate (produced by Japan Chemical Industries, Ltd.) in the amounts shown in Table 2. The insulating mica tapes of Comparative Examples 4 to 9 were made by bonding mica and a reinforcing layer (glass cloth) with a binder resin and coating said mica and reinforcing layer with epoxy adduct imidazole, zinc naphthenate and 2-methylimidazole (produced by Shikoku Kasei KK) in the amounts shown in Table 3. The properties of the mica tapes in these examples, the amount of the catalyst contained in the respective mica tapes, and the results of evaluation of the properties obtained by

TABLE 1

|  |  | Example 1 | Example 2 | Example 3 | Comp. Example 1 | Comp. Example 2 | Comp. Example 3 |
|---|---|---|---|---|---|---|---|
| Amount of catalyst | Epoxy adduct imidazole | 0.3 | 3 | 5 | — | — | — |
|  | 2-ethyl-4-methylimidazole | — | — | — | 0.3 | 3 | 5 |
| Properties | Shelf life (days) after preservation at 25° C. for 50 days | ○ | ○ | ○ | X | X | X |
|  | Gel time (min) at 120° C. | ○(40) | ○(29) | ○(22) | ○(15) | ○(8) | ○(4) |
|  | Glass transition temperature (° C.) | ○(142) | ○(145) | ○(146) | ○(142) | ○(145) | ○(148) |

The insulating mica tapes of Examples 1 to 3 were preserved at 25° C. for 50 days and their flexibility was evaluated. As a result, each of these mica tapes showed a flexibility incorporating an impregnating epoxy resin composition are shown in Table 2 for the Examples of the present invention and Table 3 for the Comparative Examples.

TABLE 2

|  |  | Example 4 | Example 5 | Example 6 | Example 7 | Example 8 | Example 9 | Example 10 | Example 11 | Example 12 |
|---|---|---|---|---|---|---|---|---|---|---|
| Amount of catalyst | Epoxy adduct imidazole | 0.3 | 0.3 | 0.3 | 3 | 3 | 3 | 5 | 5 | 5 |
|  | Zinc naphthenate | 1 | 5 | 10 | 1 | 5 | 10 | 1 | 5 | 10 |
| Properties | Shelf life (days) after preservation at 25° C. for 50 days | ○ | ○ | ○ | ○ | ○ | ○ | ○ | ○ | ○ |
|  | Gel time (min) at 120° C. | ○(15) | ○(9) | ○(4) | ○(14) | ○(8) | ○(3) | ○(14) | ○(7) | ○(3) |
|  | Glass transition temperature (° C.) | ○(142) | ○(142) | ○(142) | ○(145) | ○(145) | ○(145) | ○(146) | ○(146) | ○(146) |

TABLE 3

|  |  | Comp. Example 4 | Comp. Example 5 | Comp. Example 6 | Comp. Example 7 | Comp. Example 8 | Comp. Example 9 |
|---|---|---|---|---|---|---|---|
| Amount of catalyst | Epoxy adduct imidazole | — | — | — | — | — | — |
|  | Zinc naphthenate | 1 | 5 | 10 | 1 | 5 | 10 |
|  | 2-methylimidazole | — | — | — | 0.3 | 3 | 5 |
| Properties | Shelf life (days) after preservation at 25° C. for 50 days | ○ | ○ | ○ | X | X | X |
|  | Gel time (min) at 120° C. | ○(15) | ○(9) | ○(4) | ○(14) | ○(8) | ○(3) |
|  | Glass transition temperature (° C.) | X(120) | X(123) | X(125) | ○(142) | ○(145) | ○(147) |

The insulating mica tapes of Examples 4 to 12 using both epoxy adduct imidazole and zinc naphthenate as curing catalysts were preserved at 25° C. for 50 days and then their flexibility was evaluated. Each of these mica tapes had a flexibility factor within 100 N/m and their shelf life was above the passing standard. Also, in each case, the gel time of the mixture of a curing catalyst(s) and an epoxy resin composition was 15 minutes or less, shorter than in the previous examples, and the glass transition temperature of the cured product of said epoxy resin composition was 142° C. or higher.

In Comparative Examples 4 to 6 where zinc naphthenate alone was used, although the shelf life and the gel time were satisfactory, the glass transition temperature was 120 to 125° C., which was below the passing standard of 140° C. In Comparative Examples 7 to 9, because of use of 2-methylimidazole in place of epoxy adduct imidazole, the gel time and glass transition temperature were satisfactory, but the flexibility factor of the mica tapes exceeded 100 N/m in a short time, and no satisfactory shelf life could be obtained.

As described above, by using both epoxy adduct imidazole and zinc naphthenate as curing catalysts (Examples 4 to 12), it was possible to realize an elongation of shelf life of the insulating mica tapes and a shortening of gel time, and there could be obtained the cured product of an epoxy resin composition with high glass transition temperature.

EXAMPLES 13 TO 16 AND COMPARATIVE EXAMPLES 10 to 12

The vacuum pressure insulation coils are more susceptible to thermal stress than the single impregnation coils, and this thermal stress tends to cause a deterioration of insulating performance of the stator coils such as vacuum pressure insulation coils. Therefore, if a mechanism is introduced which is capable to deter deterioration of insulating performance when the vacuum pressure insulation coils have received thermal stress, the single impregnation coils which have less thermal stress than the vacuum pressure insulation coils can be produced relatively easily. So, in these examples, a process for producing a vacuum pressure insulation coil by applying the mica tapes according to the present invention will be described.

(Vacuum Pressure Insulation Coil>

A process for producing a vacuum pressure insulation coil by using an insulating mica tape of the present invention is explained.

FIG. 1(a) is a general external view of a single insulation coil using an insulating mica tape according to the present invention, and FIG. 1(b) is an enlarged inside sectional view of the encircled portion of FIG. 1(a).

Figure 2:
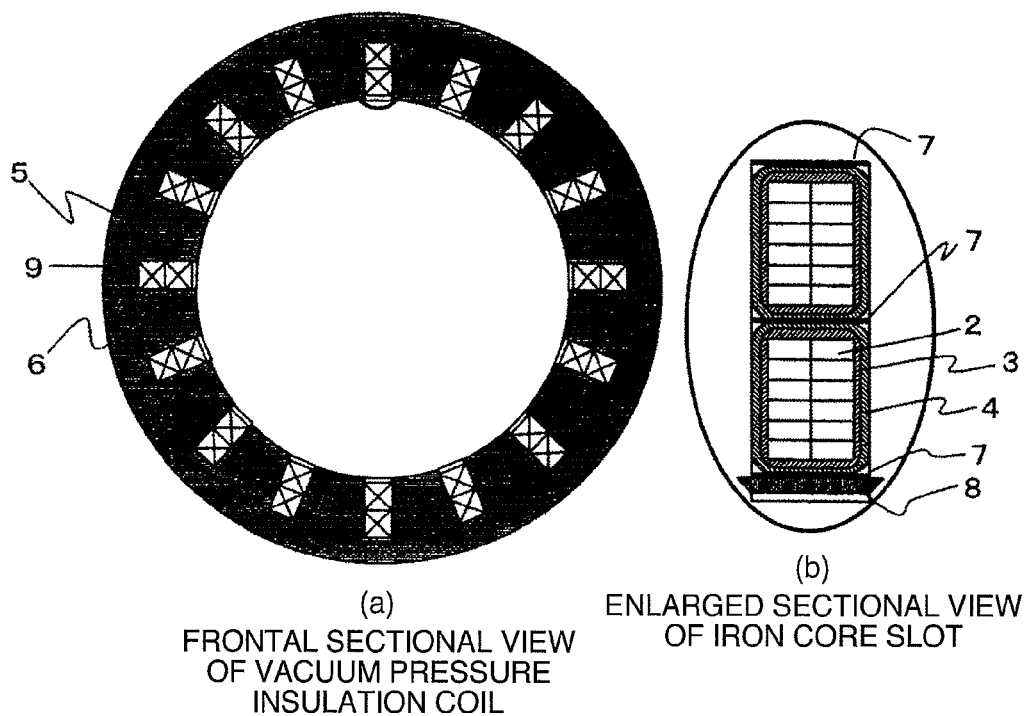
FIG. 2(a) is a frontal sectional view of a vacuum pressure insulation coil according to the present invention and (b) is an enlarged sectional view of an iron core slot.

FIG. 2(a) is a frontal sectional view of a vacuum pressure insulation coil according to the present invention, and FIG. 2(b) is an enlarged sectional view of an iron core slot (after fitted with a single insulation coil) at the elliptically encircled portion of FIG. 2(a).

The vacuum pressure insulation coil of Example 13 was made in the following way. An insulating mica tape (0.2 mm thick and 30 mm wide) having the structure of Example 2 was wound 10 half turns around an insulation coated conductor shaped into a prescribed configuration to form a single insulation coil, then this single insulation coil was fitted into each of the iron core slots 6 in an iron core 5, and then pile liners 7 and a pile 8 shown in FIG. 2(b) were inserted for fixing the single insulation coil in position to thereby make a single vacuum pressure insulation coil. This single vacuum pressure insulation coil was left in an impregnation tank maintained at 25° C., and impregnated with an epoxy resin composition [one comprising 100 parts by weight of a bisphenol A epoxy resin AER-250 (produced by Asahi Chemical Epoxy Co., Ltd.) and 100 parts by weight of an anhydrous methylhexahydrophthalic acid curing agent HN-5500 (produced by Hitachi Chemical Industries Co., Ltd.)] in vacuo under pressure, followed by heat curing at 170° C. for 10 hours to make the vacuum pressure insulation coil of Example 13.

The vacuum pressure insulation coils of Examples 14, 15 and 16 were made in the same way as in Example 13 by using the insulating mica tapes of Examples 5, 8 and 11, respectively, and the vacuum pressure insulation coils of Comparative Examples 10, 11 and 12 were also made in the same way as in Example 13 by using the insulating mica tapes of Comparative Examples 2, 5 and 8, respectively, as shown in Table 4.

Figure 4:
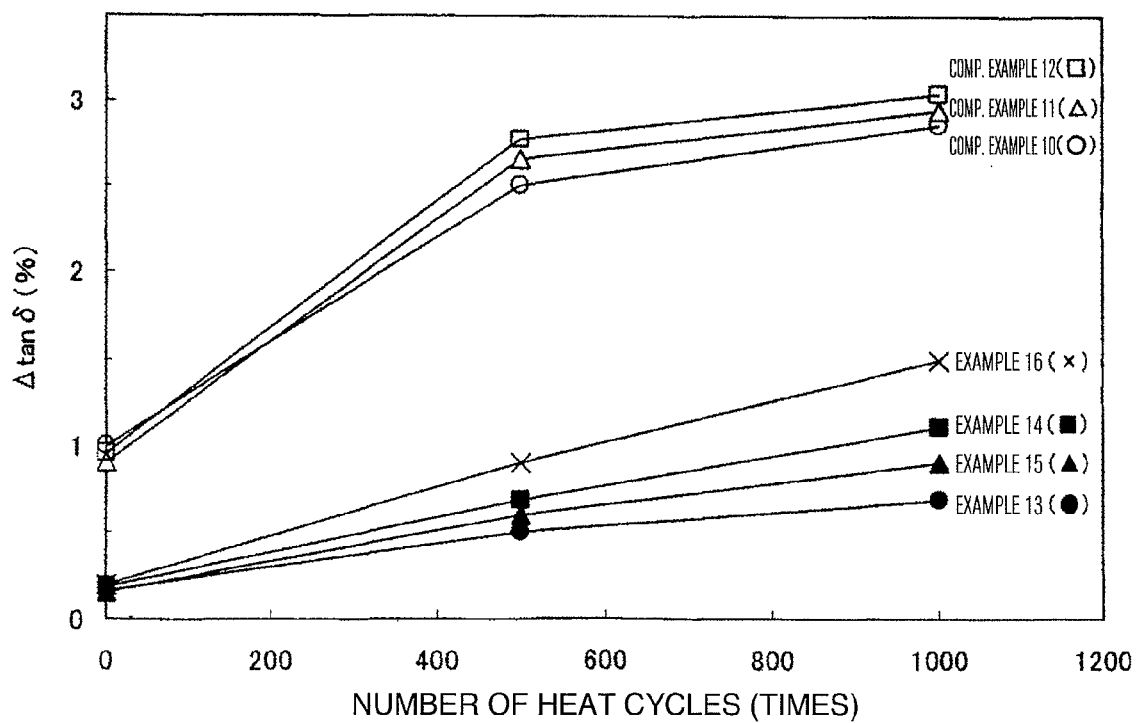
FIG. 4 is a graph showing the results of the heat cycle tests on the insulation coils according to the present invention.

The results of measurement of Δ tan δ (after 0, 500 and 1,000 heat cycles) from heat cycle resistance of the vacuum pressure insulation coils of Examples 13 to 16 and Comparative Examples 10 to 12 are shown in FIG. 4. As seen from FIG. 4, Δ tan δ after 1,000 heat cycles of the vacuum pressure insulation coils of Examples 13 to 16 was within the range of 0.7 to 1.5%, while that of the vacuum pressure insulation coils of Comparative Examples 10 to 12 was as large as 2.9 to 3.1%. The insulation coil of Comparative Example 10, because of use of a mica tape with short shelf life of Comparative Example 2, lacked flexibility and the mica peeled off when the mica tape was wound around the conductor, making it unable to obtain a secure insulation coating. Comparative Example 11, because of use of the mica tape of the structure of Comparative Example 5, was low in glass transition temperature and separation took place between the insulating layers during the heat cycles. Comparative Example 12, because of use of the mica tape with short shelf life of Comparative Example 8, lacked flexibility and mica peeled off when the mica tape was wound around the conductor, making it unable to form a secure insulation coating.

TABLE 4

|  | Example 13 | Example 14 | Example 15 | Example 16 | Comp. Example 10 | Comp. Example 11 | Comp. Example 12 |
|---|---|---|---|---|---|---|---|
| Catalyst composition of insulating mica tape used for making insulation coil | Same as Example 2 | Same as Example 5 | Same as Example 8 | Same as Example 11 | Same as Comp. Example 2 | Same as Comp. Example 5 | Same as Comp. Example 8 |

As described above, the vacuum pressure insulation coils of Examples 13 to 16 have high insulation reliability which was realized by use of the insulating mica tapes of the present invention having a long shelf life, capable of preventing run-off of the impregnating epoxy resin composition during curing, and enabling obtainment of the cured product of epoxy resin composition with high heat resistance.

EXAMPLE 17

(Rotating Machines)

A rotating machine of the present invention incorporated with a vacuum pressure insulation coil made by using an insulating mica tape of the present invention is explained.

Figure 3:
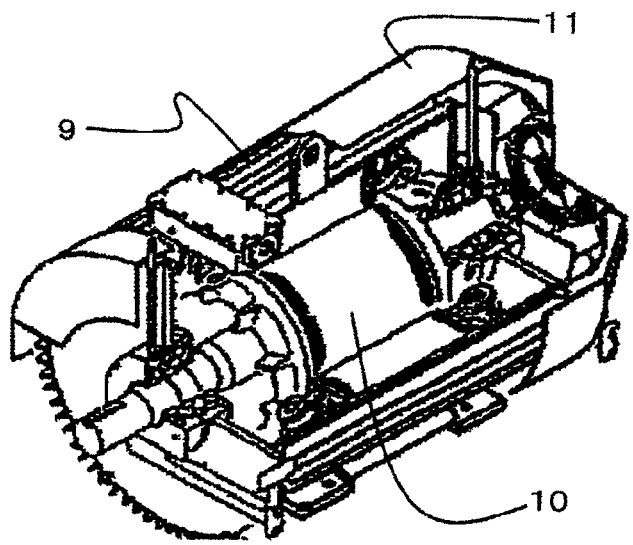
FIG. 3 is a perspective sectional view of a rotating machine using a vacuum pressure insulation coil of the present invention.

The rotating machine of Example 17, indicated by 11 in FIG. 3, was made by using the vacuum pressure insulation coil produced in Example 13, assembling said coil 9, a rotor 10 and other components and connecting them by wiring. The obtained rotating machine of Example 17 had excellent insulation reliability.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

The present invention can provide the insulating mica tapes having a long shelf life and capable of providing a cured product (insulating layer) with high glass transition temperature by heat curing the impregnating epoxy resin composition. By making the insulation coils, vacuum pressure insulation coils and rotating machines using such insulating mica tapes, it is possible to obtain the products with high insulation reliability.

The invention claimed is:

1. An insulation coil in which an insulating mica tape is wound around a conductor of a prescribed configuration to make a single insulation coil, and said single insulation coil is impregnated with an epoxy resin composition comprising an epoxy resin and an acid anhydride curing agent, followed by curing of said resin composition, wherein said insulating mica tape has a reinforcing layer, mica secured to said reinforcing layer, and a curing catalyst comprising zinc naphthenate and an epoxy adduct imidazole that has been provided on both said reinforcing layer and said mica, wherein the amount of coating of the epoxy adduct imidazole on said mica tape is 0.3 to 5 g/m$^2$ and the amount of coating of zinc naphthenate is 1 to 10 g/m$^2$.

2. An electrical rotating machine having a stator coil and a rotor, said stator coil being made by fixing the insulation coil of claim 1 in iron core slots of an iron core.

3. A vacuum pressure insulation coil in which an insulating mica tape is wound around a conductor of a prescribed configuration to make a single insulation coil, and this single insulation coil is integrated with an iron core by an epoxy resin composition comprising an epoxy resin and an acid anhydride curing agent, wherein said insulating mica tape has a reinforcing layer, mica secured to said reinforcing layer, and a curing catalyst comprising zinc naphthenate and an epoxy adduct imidazole that has been provided on both said reinforcing layer and said mica, wherein the amount of coating of the epoxy adduct imidazole on said mica tape is 0.3 to 5 g/m$^2$ and the amount of coating of zinc naphthenate is 1 to 10 g/m$^2$.

4. An electrical rotating machine having the vacuum pressure insulation coil set forth in claim 3 and a rotor.

5. A method for making an insulation coil, comprising:
providing an insulating mica tape by bonding mica and a reinforcement layer with a binder resin and coating the mica and the reinforcement layer with a curing catalyst comprising zinc naphthenate and an epoxy adduct imidazole, wherein an amount of the epoxy adduct imidazole coated on the mica and the reinforcement layer is 0.3 to 5 g/m$^2$ and the amount of zinc naphthenate coated on the mica and the reinforcement layer is 1 to 10 g/m$^2$;
winding the insulating mica tape around a conductor of a prescribed configuration to make a single insulation coil;
impregnating the single insulation coil with an epoxy resin composition comprising an epoxy resin and an acid anhydride curing agent; and
curing the epoxy resin composition.

6. The insulation coil made by the method of claim 5.

7. The insulation coil according to claim 4, wherein the reinforcement layer comprises a glass cloth or an organic material film.

8. The insulation coil according to claim 6, wherein the binder resin is an epoxy resin.

9. A method for making a vacuum pressure insulation coil, comprising:
providing an insulating mica tape by bonding mica and a reinforcement layer with a binder resin and coating the mica and the reinforcement layer with a curing catalyst comprising zinc naphthenate and an epoxy adduct imidazole, wherein an amount of the epoxy adduct imidazole coated on the mica and the reinforcement layer is 0.3 to 5 g/m$^2$ and the amount of zinc naphthenate coated on the mica and the reinforcement layer is 1 to 10 g/m$^2$;
winding the insulating mica tape around a conductor of a prescribed configuration to make a single insulation coil;
integrating the single insulation coil with an iron core by an epoxy resin composition comprising an epoxy resin and an acid anhydride curing agent; and
curing the epoxy resin composition.

10. The vacuum pressure insulation coil made by the method of claim 9.

11. The vacuum pressure insulation coil according to claim 10, wherein the reinforcement layer comprises a glass cloth or an organic material film.

12. The vacuum pressure insulation coil according to claim 10, wherein the binder resin is an epoxy resin.

* * * * *